UNITED STATES PATENT OFFICE.

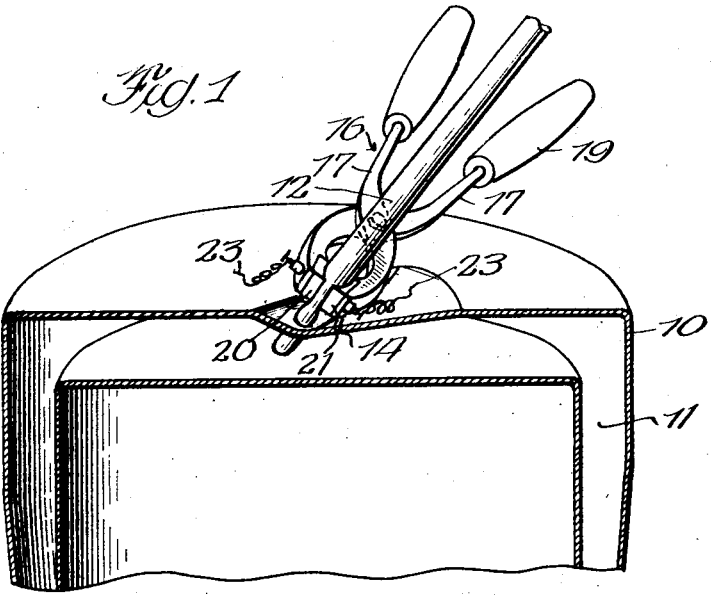
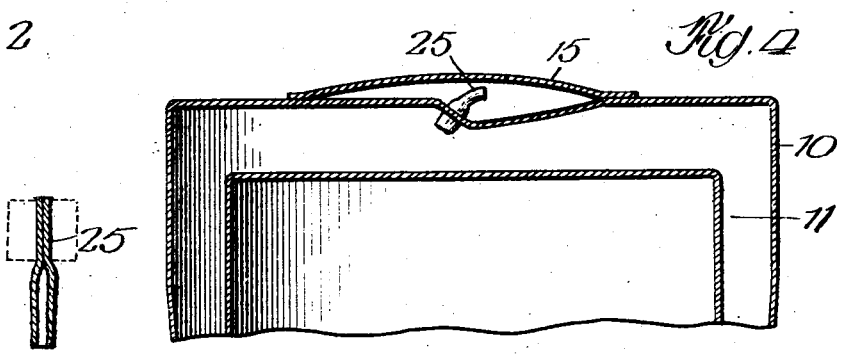
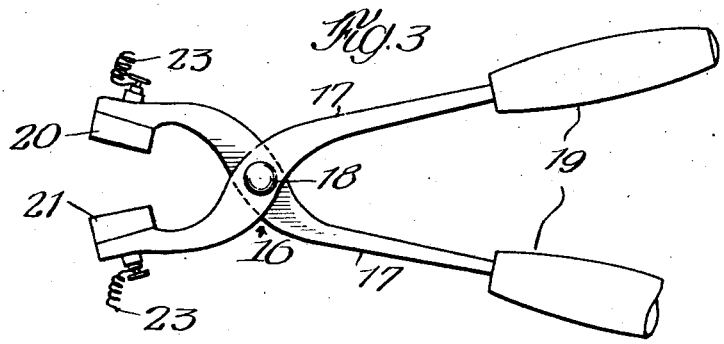

JOHN L. FATE, OF CHICAGO, ILLINOIS; DAISY L. FATE, EXECUTRIX OF SAID JOHN L. FATE, DECEASED, ASSIGNOR, BY MESNE ASSIGNMENTS, TO C. ROY GLEASON, OF CHICAGO, ILLINOIS.

METHOD OF SEALING VACUUM-JACKETS.

1,388,248.   Specification of Letters Patent.   Patented Aug. 23, 1921.

Application filed September 18, 1918. Serial No. 254,548.

*To all whom it may concern:*

Be it known that I, JOHN L. FATE, a citizen of the United States, and a resident of Chicago, in Cook county, Illinois, have invented certain new and useful Improvements in Methods of Sealing Vacuum-Jackets; and I do hereby declare that the following is a full, clear, and exact description thereof, reference being had to the accompanying drawings, and to the characters of reference marked thereon, which form a part of this specification.

This invention relates to a novel method for sealing vacuum jackets from which air has been withdrawn to produce a high vacuum therein.

In vacuumizing such jackets, a pipe connection with an exhaust pump is extended with one end through the wall of the jacket into the space to be exhausted and the successive impulses of the pump gradually reduce the pressure in the space until the desired vacuum is attained. In order that there shall be no leakage of air into the space which is being exhausted, which would reduce the vacuum, it is necessary to provide some means for quickly sealing the tube or pipe connection to the pump and through which air is exhausted from the space and such sealing should be effected at a point on both sides of which a low pressure or vacuum exists.

It is the purpose of the present invention to provide a novel method of sealing the tube through which air is exhausted from the jacket.

In accordance with the present method, it is proposed to apply pressure to the tube through which the air is withdrawn from the jacket at a point closely adjacent to the jacket so as to pinch the walls of the tube together and to thereafter fuse the material of the pipe or tube to cause the walls to be welded together so as to effectively close or seal the jacket space. Thereafter the tube is severed exterior to its point of weld and may be flattened on the wall of the jacket through which the tube extends, and if desired a cap may be applied over and welded or soldered to said wall to prevent the welded and cut tube from striking an obstruction which would tend to rupture it.

Any suitable means may be employed for thus fusing the material of the tube to weld it at the flattened portion thereof. As herein shown, and preferably, such welding effect is produced by an electric process in the well known manner of electric welding. That is to say, it is convenient and practicable to pinch the walls of the tube together between electrodes of a welding device, which electrodes may be either hand or foot actuated, and so arranged, either manually or by automatic means, to first force the electrodes together as the active elements of a pincer to flatten the tube and thereafter close the electric circuit in which the electrodes are contained. In practice, if the machine embraces automatic functions to sequentially press the tube walls together and close the circuit through the electrodes, the actuating device for the electrodes may be so connected with the operating mechanism that the first movement of the operating mechanism, whether manual or automatic, will press the tube walls together and thereafter operate a switch to close the welding circuit. So also nippers or cutting devices may be associated with the operating device in such manner that a continued movement of the operating device in its direction of operative travel will bring into action the cutting or nipping knives to sever the tube exterior to the weld. As herein shown, the pinching and welding means are diagrammatically illustrated.

As shown in the drawings,—

Figure 1 illustrates a vacuum jacket which may be of any suitable form in which a vacuum is to be produced, and illustrating the means for pressing the walls of the exhaust tube together and welding the walls together to seal the same.

Fig. 2 illustrates the tube after it has been flattened by the pincer device, comprising in this instance the electrodes suitably applied to a manual pincer device.

Fig. 3 is a plan view of the combined pincer and welding device.

Fig. 4 illustrates the means of protecting the welded and cut tube.

As shown in the drawings, 10 designates a hollow body or jacket adapted to afford a vacuum chamber 11. This jacket will be made of any suitable form adapting itself to a particular use.

12 designates an exhaust tube that extends at one end through an opening in one wall of the jacket 10 and is adapted to connect at its other end with a vacuum pump not shown.

As herein shown, and preferably, the portion of the wall through which the exhaust tube 12 extends is disposed at an angle to the plane of the wall, and said wall is formed to produce a depression 14 into which the sealed tube after it has been severed is adapted to lie. When the tube is sealed and cut off, it is depressed in the depression 14 and may be covered by a cap 15 placed thereover and brazed or otherwise fixed to the jacket wall.

16 designates as a whole an implement by which the exhaust tube is flattened. It comprises two arms 17, 17 that are pivoted at 18 between their ends and are provided with hand pieces 19. When the tube is closed by electrically welding the flattened walls together, the said handles 19 are made of insulating material. 20, 21 designate blocks at the ends of the bars 17 remote from the hand pieces 19. Said blocks are fashioned so that when brought together their proximate faces are parallel. Said blocks constitute the active elements of the pincer device. When the tube is electrically heated to weld the walls together, the blocks 20, 21 constitute the electrodes of an electric welding device that are connected by the wires 23, 23 to a suitable source of electrical energy.

In practising my improved methods, after the nipple has been inserted through the wall of the jacket with its inner end in communication with the space 11 of the jacket, and the tube has been brazed or otherwise fixed to the jacket by means affording an air tight joint, the blocks 20, 21 are applied to the exhaust tube near the jacket wall and, through the action of the hand pieces 19, are forced or pressed inwardly against said tube to produce the flattened portion 25 shown in Fig. 2. Thereafter the circuit, including the blocks 20, 21 as electrodes, is closed so as to heat the material of the flattened tube walls to cause the same to fuse and adhere together and thus seal the exhaust tube. Thereafter the exhaust tube is clipped or cut off exteriorly to the sealed portion thereof, and the flattened sealed end of the tube is pressed downwardly into the depression 14 and may be thereafter covered by the cap 15.

The flattening of the tube and the sealing of the walls together will, of course, be effected after the desired vacuum has been attained in the space 11, and before the tube is flattened a valve in the exhaust pipe will be closed so that there is a maintained vacuum on both sides of the point of the exhaust tube at which the walls are flattened and at which the flattened walls are welded together. Therefore, there is no chance for air to pass from the atmosphere through the tube while the sealing is being effected. The area of the welding of the flattened walls will be such as to insure an efficient seal in the tube 12 such as will be as permanent a seal as in any other portion of the wall inclosing the vacuum chamber 11.

The nippers or cutting device by which the tube is severed exteriorly to the wall are not herein shown, but it will be understood that any suitable form of cutting device may be employed when the method is effected by the manual means herein disclosed.

As before stated, the pincer and welding blocks 20, 21 may be so connected with manual or automatic power as to first flatten the tube, thereafter close the welding circuit, and thereafter in the continued movement of the operating member to effect the severing action of the cutting or clipping knives, such as is shown in my aforesaid application.

I claim as my invention,—

1. The method of exhausting and sealing vacuum jackets which consists in exhausting air from the jacket through a conduit, pressing the walls of the conduit together exterior to the jacket, and substantially simultaneously fusing the flattened walls of the conduit to weld them together.

2. The method of substantially simultaneously exhausting and sealing vacuum jackets which consists in exhausting air from the jacket through a conduit, pressing the walls of the conduit together exteriorly to the jacket, by heating means to fuse the flattened walls of the conduit to weld them together and thereafter severing the conduit exteriorly to said flattened fused portion.

3. The method of exhausting and sealing vacuum jackets which consists in exhausting air from the jacket through a conduit, pressing the walls of the conduit together exteriorly to the jacket, substantially simultaneously fusing the flattened walls of the conduit to weld them together, thereafter severing the conduit exteriorly to said flattened fused portion, and thereafter bending the flattened fused conduit toward the jacket wall.

4. The method of exhausting and sealing vacuum jackets which consists in exhausing air from the jacket through a conduit, pressing the walls of the conduit together exteriorly to the jacket, substantially simultaneously fusing the flattened walls of the conduit to weld them together, thereafter severing the conduit exteriorly to said flattened fused portion, thereafter bending the flattened fused conduit toward the jacket wall, and thereafter applying a cap over the jacket wall to inclose the fused flattened end of the conduit.

5. The method of exhausting and sealing vacuum jackets at one and the same operation which consists in exhausting air from the jacket through a conduit, pressing the walls of the conduit together exterior to the jacket and electrically welding the flattened walls of the conduit by the pressing means.

In testimony whereof, I claim the foregoing as my invention, I hereunto append my signature at Chicago, Illinois, this 14th day of September, 1918.

JOHN L. FATE.